United States Patent
Perry et al.

(10) Patent No.: US 11,462,761 B2
(45) Date of Patent: Oct. 4, 2022

(54) REGENERATION OF FLOW BATTERY

(71) Applicant: Raytheon Technologies Corporation, Farmington, CT (US)

(72) Inventors: Michael L. Perry, Glastonbury, CT (US); Joseph Sullivan, Hanover, NH (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 0 days.

(21) Appl. No.: 16/959,703

(22) PCT Filed: Jan. 10, 2018

(86) PCT No.: PCT/US2018/013066
§ 371 (c)(1),
(2) Date: Jul. 2, 2020

(87) PCT Pub. No.: WO2019/139566
PCT Pub. Date: Jul. 18, 2019

(65) Prior Publication Data
US 2021/0083310 A1 Mar. 18, 2021

(51) Int. Cl.
*H01M 6/50* (2006.01)
*H01M 8/18* (2006.01)
(Continued)

(52) U.S. Cl.
CPC ....... *H01M 8/188* (2013.01); *H01M 8/04007* (2013.01); *H01M 8/04432* (2013.01);
(Continued)

(58) Field of Classification Search
CPC ........ H01M 8/188; H01M 8/182; H01M 8/18; H01M 8/20; H01M 8/04007;
(Continued)

(56) References Cited

U.S. PATENT DOCUMENTS

| | | | |
|---|---|---|---|
| 2008/0193828 A1* | 8/2008 | Sahu | H01M 8/04186 429/63 |
| 2014/0227620 A1 | 8/2014 | Perry | |
| 2016/0315337 A1 | 10/2016 | Perry | |

FOREIGN PATENT DOCUMENTS

| | | |
|---|---|---|
| EP | 3240083 | 11/2017 |
| JP | 2007188729 | 7/2007 |

(Continued)

OTHER PUBLICATIONS

Supplementary European Search Report for European Patent Application No. 18900029.2 completed Sep. 15, 2021.
(Continued)

*Primary Examiner* — Raymond Alejandro
(74) *Attorney, Agent, or Firm* — Carlson, Gaskey & Olds, P.C.

(57) ABSTRACT

A redox flow battery includes a redox flow cell, a supply/storage system external of the redox flow cell, and a controller. The supply/storage system includes first and second electrolytes for circulation through the redox flow cell. The first electrolyte is a liquid electrolyte having electrochemically active species with multiple, reversible oxidation states. The electrochemically active species can form a solid precipitate blockage in the redox flow cell. The controller is configured to identify whether there is the solid precipitate blockage in the redox flow cell and, if so, initiate a regeneration mode that reduces the oxidation state of the electrochemically active species in the liquid electrolyte to dissolve, in situ, the solid precipitate blockage.

18 Claims, 4 Drawing Sheets

(51) Int. Cl.
   *H02J 7/00* (2006.01)
   *H01M 8/04007* (2016.01)
   *H01M 8/0438* (2016.01)
   *H01M 8/0444* (2016.01)
   *H01M 8/04746* (2016.01)
   *H01M 8/04858* (2016.01)

(52) U.S. Cl.
   CPC ... *H01M 8/04477* (2013.01); *H01M 8/04753* (2013.01); *H01M 8/04873* (2013.01); *H02J 7/0069* (2020.01)

(58) Field of Classification Search
   CPC ......... H01M 8/04029; H01M 8/04432; H01M 8/04388; H01M 8/04477; H01M 8/04783; H01M 8/04753; H01M 8/04873; H02J 7/0069
   See application file for complete search history.

(56) References Cited

FOREIGN PATENT DOCUMENTS

| | | |
|---|---|---|
| KR | 1020160077530 | 7/2016 |
| WO | 2016043692 | 3/2016 |
| WO | 2016104124 | 6/2016 |
| WO | 2016105130 | 6/2016 |
| WO | 2016202950 | 12/2016 |

OTHER PUBLICATIONS

International Preliminary Report on Patentability for International Application No. PCT/US2018/013066 dated Jul. 23, 2020.
International Search Report and Written Opinion for International Patent Application No. PCT/US2018/013066 completed Mar. 12, 2018.

* cited by examiner

REGENERATION OF FLOW BATTERY

BACKGROUND

Redox flow batteries are designed to convert electrical energy into chemical energy that can be stored and later released when there is demand. As an example, a flow battery may be used with a renewable energy system, such as a wind-powered system, to store energy that exceeds consumer demand and later release that energy when there is greater demand.

A typical flow battery includes a redox flow cell that has a negative electrode and a positive electrode separated by an electrolyte layer, which may include a separator, such as an ion-exchange membrane. A negative fluid electrolyte (sometimes referred to as the anolyte) is delivered to the negative electrode and a positive fluid electrolyte (sometimes referred to as the catholyte) is delivered to the positive electrode to drive electrochemically reversible redox reactions. Upon charging, the electrical energy supplied causes a chemical reduction reaction in one electrolyte and an oxidation reaction in the other electrolyte. The separator prevents the electrolytes from freely and rapidly mixing but permits selected ions to pass through to complete the redox reactions. Upon discharge, the chemical energy contained in the liquid electrolytes is released in the reverse reactions and electrical energy can be drawn from the electrodes. Flow batteries are distinguished from other electrochemical devices by, inter alia, the use of externally-supplied, fluid electrolyte solutions that include reactants that participate in reversible electrochemical reactions.

SUMMARY

A redox flow battery according to an example of the present disclosure includes a redox flow cell, and a supply/storage system external of the redox flow cell. The supply/storage system has first and second electrolytes for circulation through the redox flow cell. The first electrolyte is a liquid electrolyte that has electrochemically active species with multiple, reversible oxidation states. The electrochemically active species can form a solid precipitate blockage in the redox flow cell. A controller is configured to identify whether there is the solid precipitate blockage in the redox flow cell and, if so, initiate a regeneration mode that reduces the oxidation state of the electrochemically active species in the liquid electrolyte to dissolve, in situ, the solid precipitate blockage.

In a further embodiment of any of the foregoing embodiments, the controller is configured, in the regeneration mode, to cease an active external charge/discharge mode and to place the redox flow cell into an open cell voltage mode.

In a further embodiment of any of the foregoing embodiments, the controller is configured, after placing the redox flow cell in the open cell voltage mode, to place the redox flow cell in a steady-state float mode in which flow of the first electrolyte through the redox flow cell is ceased and flow of the second electrolyte through the redox flow cell continues.

In a further embodiment of any of the foregoing embodiments, the controller is configured, in the regeneration mode, to drive the open cell voltage toward zero by engaging a resistor across the redox flow battery.

In a further embodiment of any of the foregoing embodiments, the controller is configured to drive the open cell voltage to less than 0.2V.

In a further embodiment of any of the foregoing embodiments, the controller is configured to hold the steady-state float mode for a pre-selected amount of time.

In a further embodiment of any of the foregoing embodiments, the controller is configured to, after the pre-selected amount of time, place the redox flow cell in the active external charge/discharge mode by starting the flow of the first electrolyte through the redox flow cell, and then initiate a verification to determine whether the solid precipitate blockage is alleviated.

In a further embodiment of any of the foregoing embodiments, the supply/storage system further comprises a filter through which the liquid electrolyte flows, and pressure devices at an inlet and outlet of the filter for measuring pressure of the liquid electrolyte. The controller is configured to determine a pressure drop across the filter for the verification.

In a further embodiment of any of the foregoing embodiments, the controller is configured to re-initiate the regeneration mode if the solid precipitate blockage is not alleviated with respect to a threshold.

In a further embodiment of any of the foregoing embodiments, the electrochemically active species include vanadium.

In a further embodiment of any of the foregoing embodiments, the supply/storage system further comprises a heat exchanger, and the controller, in the regeneration mode, is configured to cool one of the electrolytes in the heat exchanger in order to cool the redox flow cell.

A method for regenerating a flow battery according to an example of the present disclosure includes identifying whether there is a solid precipitate blockage in the redox flow cell, and in response, initiating a regeneration mode that reduces an oxidation state of electrochemically active species in the liquid electrolyte to dissolve, in situ, the solid precipitate blockage.

In a further embodiment of any of the foregoing embodiments, the regeneration mode includes ceasing an active external charge/discharge mode and placing the redox flow cell into an open cell voltage mode.

In a further embodiment of any of the foregoing embodiments, after placing the redox flow cell in the open cell voltage mode, placing the redox flow cell in a steady-state float mode in which flow of the first electrolyte through the redox flow cell is ceased and flow of the second electrolyte through the redox flow cell continues.

A further embodiment of any of the foregoing embodiments includes driving the open cell voltage toward zero by engaging a resistor across the redox flow battery.

A further embodiment of any of the foregoing embodiments includes driving the open cell voltage to less than 0.2V.

A further embodiment of any of the foregoing embodiments includes holding the steady-state float mode for a pre-selected amount of time.

A further embodiment of any of the foregoing embodiments includes after the pre-selected amount of time, placing the redox flow cell in the active external charge/discharge mode by starting the flow of the first electrolyte through the redox flow cell, and then initiating a verification to determine whether the solid precipitate blockage is alleviated.

A further embodiment of any of the foregoing embodiments includes determining a pressure drop across a filter in the supply/storage system for the verification.

A further embodiment of any of the foregoing embodiments includes re-initiating the regeneration mode if the solid precipitate blockage is not alleviated with respect to a threshold.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1:
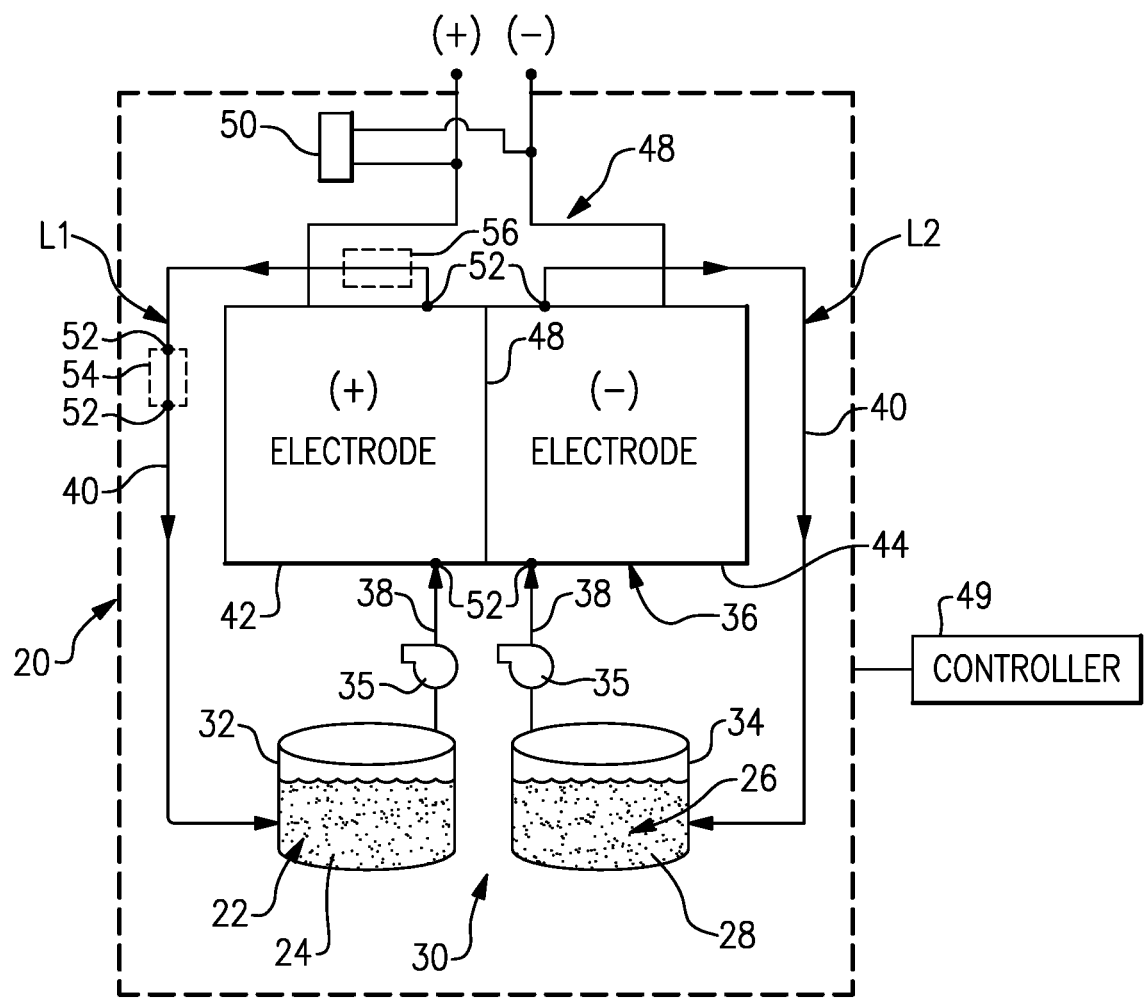
FIG. 1 illustrates an example redox flow battery.

FIG. 1 schematically shows portions of an example redox flow battery 20 for selectively storing and discharging electrical energy. As an example, the flow battery 20 can be used to convert electrical energy generated in a renewable energy system to chemical energy that is stored until a later time when there is greater demand, at which time the flow battery 20 can be used to convert the chemical energy back into electrical energy. The flow battery 20 can supply the electric energy to an electric grid, for example. The disclosed flow battery 20 includes features for enhanced durability with respect to maintaining high cell performance through in-situ regeneration.

The flow battery 20 includes a first electrolyte 22 that has at least one electrochemically active species 24 that functions in a redox pair with regard to an additional second electrolyte 26 that has at least one electrochemically active species 28. At least the first electrolyte is a liquid but the second electrolyte is most typically also a liquid. For example, the electrochemically active species 24, 28 are based on vanadium or iron. The electrochemically active species 24, 28 can include ions of elements that have multiple, reversible oxidation states in a selected liquid solution, such as but not limited to, aqueous solutions or dilute aqueous acids, such as 1-5M sulfuric acid. In some examples, the multiple oxidation states are non-zero oxidation states, such as for transition metals including but not limited to vanadium, iron, manganese, chromium, zinc, molybdenum and combinations thereof, and other elements including but not limited to sulfur, cerium, lead, tin, titanium, germanium and combinations thereof. In some examples, the multiple oxidation states can include the zero oxidation state if the element is readily soluble in the selected liquid solution in the zero oxidation state. Such elements can include the halogens, such as bromine, chlorine, and combinations thereof. The electrochemically active species 24, 28 could also be organic molecules that contain groups that undergo electrochemically reversible reactions, such as quinones or nitrogen-containing organics such as quinoxalines or pyrazines. In embodiments, the electrolytes 22 and 26 are solutions that include one or more of the electrochemically active species 24, 28. The first electrolyte 22 (e.g., the positive electrolyte) and the second electrolyte 26 (e.g., the negative electrolyte) are contained in a supply/storage system 30 that includes first and second vessels 32, 34.

In one example based on vanadium for the fluid electrolytes 22, 26, the electrolytes have a fully balanced average oxidation state is +3.5 based upon the use of $V^{2+}/V^{3+}$ and $V^{4+}/V^{5+}$ (which can also be denoted as V(ii)/V(iii) and V(iv)/V(v), although the valences of the vanadium species with oxidation states of 4 and 5 are not necessarily 4+ and 5+) as the electrochemically active species 24, 28. For example, if the electrolyte solution is aqueous sulfuric acid, then the V(iv)/V(v) species of the first electrolyte 22 will be present as $VO^{2+}$ and $VO_2^+$ and the V(ii)/V(iii) species of the second electrolyte will be present as and $V^{2+}$ and $V^{3+}$ ions.

The electrolytes 22, 26 are circulated by pumps 35 to at least one redox flow cell 36 of the flow battery 20 through respective feed lines 38, and are returned from the cell 36 to the vessels 32, 34 via return lines 40. As can be appreciated, additional pumps 35 can be used if needed, as well as valves (not shown) at the inlets/outlets of the components of the flow battery 20 to control flow. In this example, the feed lines 38 and the return lines 40 connect the vessels 32, 34 in respective loops L1/L2 with first and second electrodes 42, 44. Multiple cells 36 can be provided as a stack within the loops L1/L2.

The cell or cells 36 each include the first electrode 42, the second electrode 44 spaced apart from the first electrode 42, and an electrolyte separator layer 46 arranged between the first electrode 42 and the second electrode 44. For example, the electrodes 42, 44 are porous carbon structures, such as carbon paper or felt. The electrodes may also contain additional materials which are catalytically-active, for example a metal oxide. In general, the cell or cells 36 can include bipolar plates, manifolds and the like for delivering the electrolytes 22, 26 through flow field channels to the electrodes 42, 44. It is to be understood however, that other configurations can be used. For example, the cell or cells 36 can alternatively be configured for flow-through operation where the fluid electrolytes 22, 26 are pumped directly into the electrodes 42, 44 without the use of flow field channels.

The electrolyte separator layer 46 can be, but is not limited to, an ionic-exchange membrane, a micro-porous polymer membrane or an electrically insulating microporous matrix of a material, such as silicon carbide (SiC), that prevents the fluid electrolytes 22, 26 from freely and rapidly mixing but permits selected ions to pass through to complete the redox reactions while electrically isolating the electrodes 42, 44. In this regard, the loops L1/L2 are isolated from each other during normal operation, such as charge, discharge and shutdown states.

The fluid electrolytes 22, 26 are delivered to, and circulate through, the cell or cells 36 during an active charge/discharge mode to either convert electrical energy into chemical energy or, in the reverse reaction, convert chemical energy into electrical energy that is discharged. The electrical energy is transmitted to and from the cell or cells 36 through an electric circuit 48 that is electrically coupled with the electrodes 42, 44.

The flow battery 20 can also be transitioned from the active charge/discharge mode to a fully shutdown mode in which neither of the fluid electrolytes 22, 26 are circulated through the cells 36. For example, in the fully shutdown mode, the fluid electrolytes 22, 26 are either emptied from the cells 36 or are left in the cells 36 but not circulated. In this regard, the flow battery 20 also includes a controller 49 that has hardware, such as a microprocessor, software, or both that are configured to control the operation of the flow battery 20, including shutdown from the active charge/discharge mode, start-up from the inactive shutdown mode, and selective regeneration of the cell or cells 36, described in further detail herein.

At times, the electrochemically active species 24, 28 (e.g., vanadium species) may precipitate out of solution as a solid. This solid precipitate can at least partially block flow of the electrolytes 22, 26 through the cell 36 and thus debit performance and damage system components. The positive electrode 42 can be particularly prone to precipitation for several reasons. The electrochemical reaction at the positive electrode 42 generates heat, thereby having the potential to raise the temperature of the first electrolyte 22. The oxidized form of the species 24 in the positive electrode 42 (i.e., $V^{5+}$) is prone to a thermally-induced precipitation reaction (e.g., at >40° C. at typical concentrations). This reaction forms a low solubility vanadium oxide specie that can precipitate and block flow. Expressed in simple form, the reaction is $V(5+)+H_2O \rightarrow V_2O_5(solid)+H_2SO_4$. The actual specie reaction is $(VO_2)_2(SO_4)+H_2O \rightarrow V_2O_5(solid)+H_2SO_4$. Although the vanadium ions in the negative electrode 44 can also precipitate, the reaction for precipitation of the $V^{3+}$ and $V^{2+}$ ions is much less likely than the reaction for precipitation of the vanadium oxide species in the positive electrode 42. As described in more detail below, the flow battery 20 includes features for in-situ regeneration to dissolve such solid precipitates and thus alleviate blockage. Although the examples herein are described with respect to vanadium, this disclosure is applicable to other active species that readily precipitate and dissolve with shifts in state of charge of the electrolytes. For example, this may include transition-metal ions that may be inadvertently reduced to zero oxidation state, due to excessive negative overpotential on the negative electrode, and the resulting metal may deposit or precipitate in the negative electrode.

Figure 2:
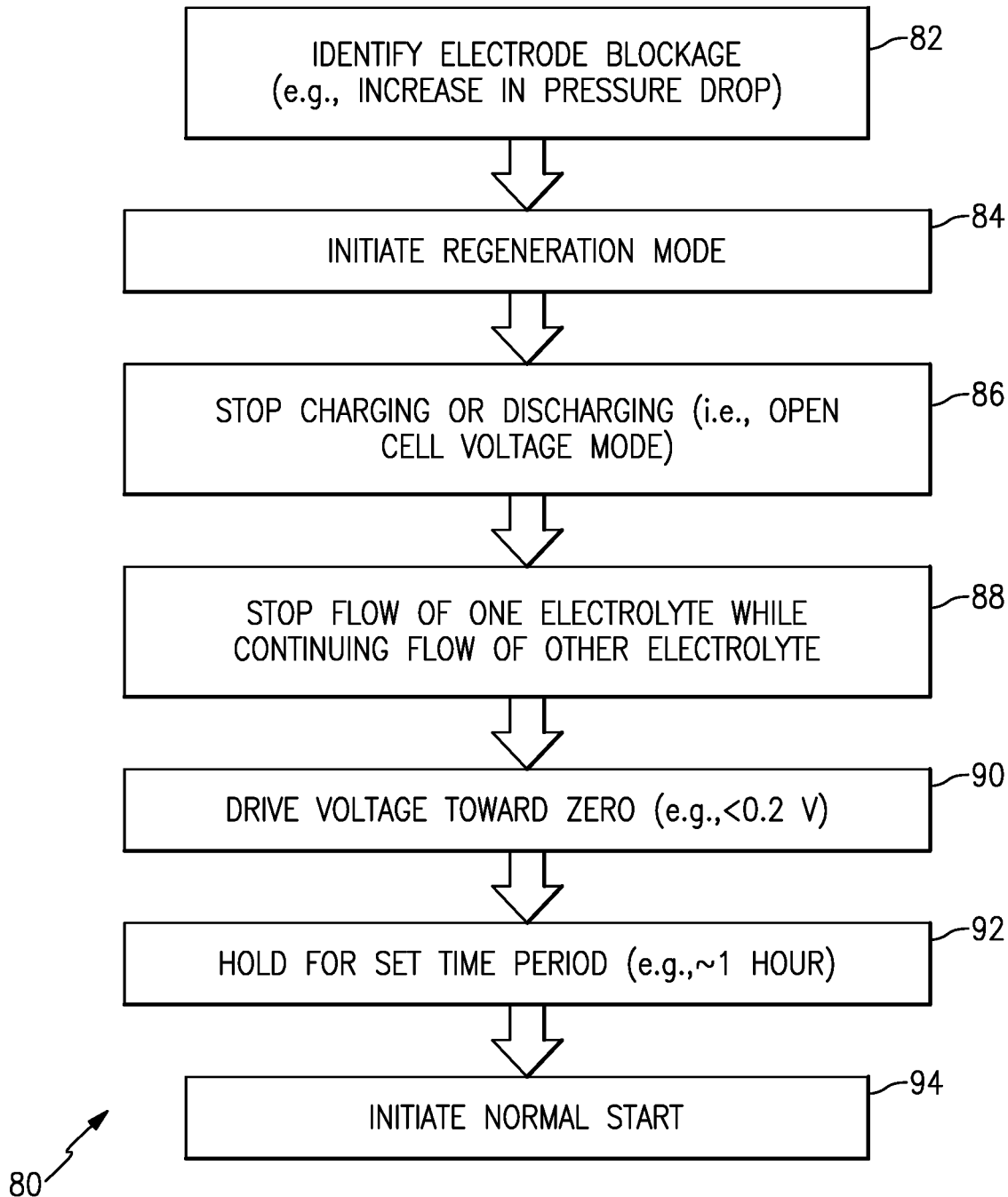
FIG. 2 depicts a method of regenerating a redox flow battery.

In the illustrated example, the controller 49 is configured to regenerate the cell 36 with respect to diminishing the presence of solid precipitate blockages. With continued reference to FIG. 1, the regeneration will also be described with reference to a method 80 in FIG. 2 and a series of FIGS. 3, 4, 5, 6, and 7 that schematically depict the cell 36 at various stages during the regeneration. It is to be understood that the controller 49 is configured (e.g., programmed) to carry out the functions and steps described herein, including those in the method 80.

The method 80 first includes at 82 a step of identifying whether there is solid precipitate blockage in the cell 36. The controller 49 can identify whether there is solid precipitate blockage by checking one or more operating parameters of the cell 36 or overall flow battery 20. Most typically, the parameter will be pressure drop across the cell 36. The solid precipitate blockage reduces electrolyte flow through the cell 36. Thus, pressure drop can be used to represent whether there is solid precipitate blockage and to what extent there is blockage. For instance, as the blockage increases and flow is further hindered, the pressure drop will increase.

The flow battery 20 may have pressure transducers 52 for measuring pressure of the electrolytes 22, 26 at various locations. As an example, the pressure transducers 52 are located at the inlets and outlets of the positive and negative electrodes of the cell 36. The controller 49 can monitor or periodically poll the transducers 52 in order to determine an instant pressure drop across each of the electrodes 42, 44. If the instant pressure drop exceeds a pre-set threshold, the controller 49 may then responsively trigger initiation of a regeneration mode that reduces the oxidation state of the electrochemically active species in the liquid electrolyte to dissolve, in situ, the solid precipitate blockage.

There are several non-limiting approaches for determining when a pressure drop, and thus a solid precipitate blockage, requires regeneration. For instance, the controller 49 may be programmed with a pre-set threshold that is a certain percentage higher than a baseline. As an example, if baseline pressure drop is 10 units, a threshold of 10% would trigger the regeneration if the pressure drop were to increase to 11 units. A threshold of 10% or 20% may be sufficient in some cases to identify solid precipitate blockage and trigger regeneration.

Another approach may utilize a look-up table. The viscosity of the electrolytes 22, 26 may change with changes in temperature and with changes in concentration. Changes in viscosity may cause changes in pressure drop (e.g., there is higher pressure drop with higher viscosities). In order to identify whether a measured pressure drop represents a solid precipitate blockage or not, the controller may utilize a look-up table that has values of pressure drop cross-referenced to operating parameters, such as temperature, concentration, or both. The look-up table may list what the expected pressure drop will be for a given parameter or set of parameters. If a measured pressure drop exceeds the expected pressure drop of the look-up table, the controller 49 may then trigger the regeneration mode. As above, a threshold or percentage may be used.

Pressure drop may be a direct way to identify whether there is significant solid precipitate blockage; however, other cell parameters or conditions may alternatively or additionally be used. For example, the performance of the battery 20, the flow rate of the electrolytes 22, 26, or the like may be used as an indication of blockage. Similar to pressure drop, thresholds, percentages, and/or look-up tables for a selected indicator of blockage may be used to facilitate identification of solid precipitate blockage.

Figure 3:
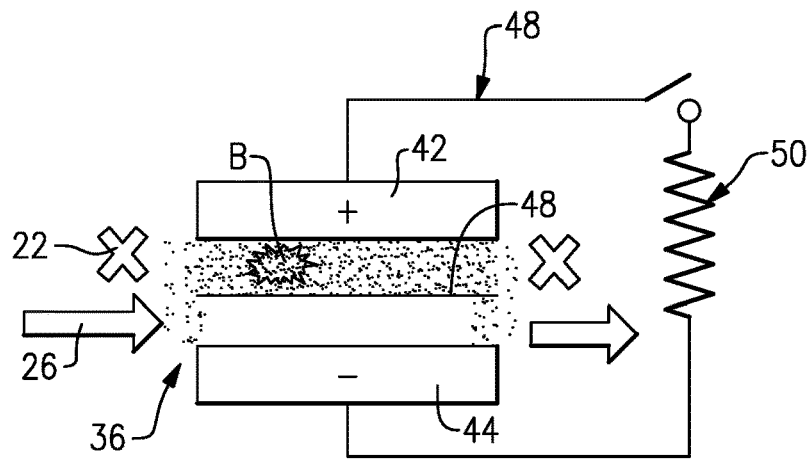
FIG. 3-7 illustrate the redox flow battery during various stages of the method.
Figure 4:
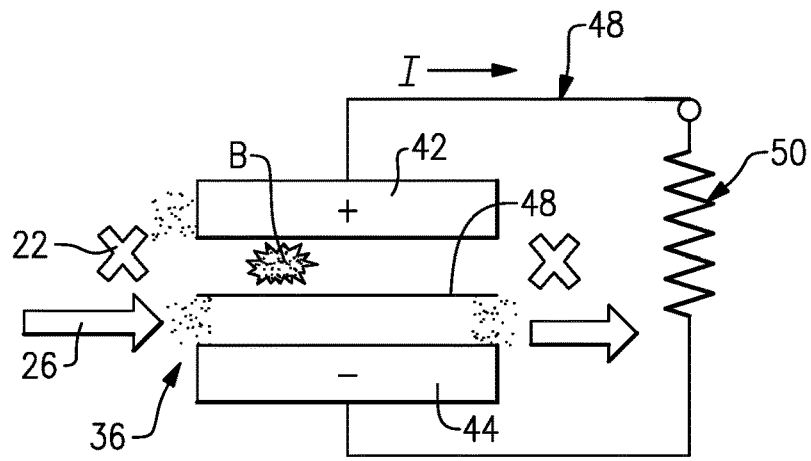

If the controller 49 identifies solid precipitate blockage, which is indicated at B in FIG. 3, the controller 49 initiates the regeneration mode at 84 in method 80. In FIG. 3, the blockage is in the positive side of the cell 36, although these example are also applicable to a blockage in the negative side. Once in the regeneration mode 84, the controller 49 ceases the active charge/discharge mode at 86. That is, the controller 49 opens the external electric circuit 48 such that no external current flows in and no current flows externally out. This places the cell 36 into an open cell voltage mode.

After placing the cell 36 in the open cell voltage mode, at 88 in the method 80 the controller 49 places the cell 36 into a steady-state float mode, represented in FIG. 3. In this mode, the controller 49 ceases flow of the first electrolyte 22 (the one with the blockage) through the cell 36 and continues flow of the second electrolyte 26 through the cell 36. If the blockage were in the second electrolyte 26, the controller 49 would cease flow of the second electrolyte 26 through the cell 36 and continue flow of the first electrolyte 22 through the cell 36. Ceasing of flow is represented by "X" in FIG. 3, and flow arrows represent continuous flow of the second electrolyte 26 flow through the cell 36 in FIG. 3. Similar nomenclature is used in FIGS. 4-7.

Figure 5:
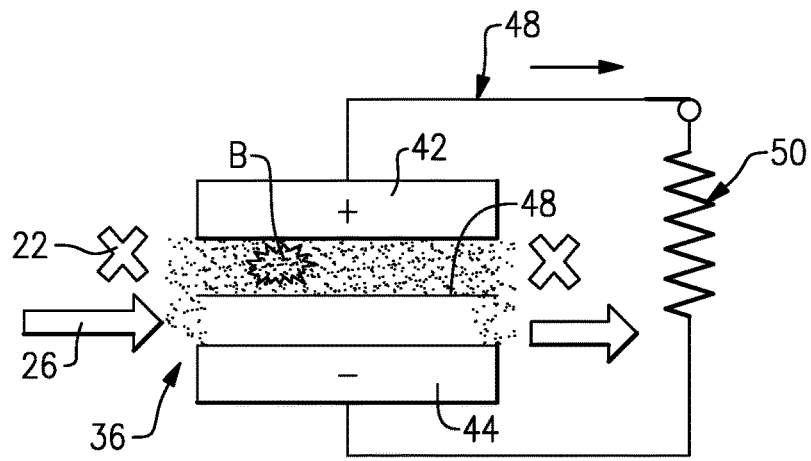
Figure 6:
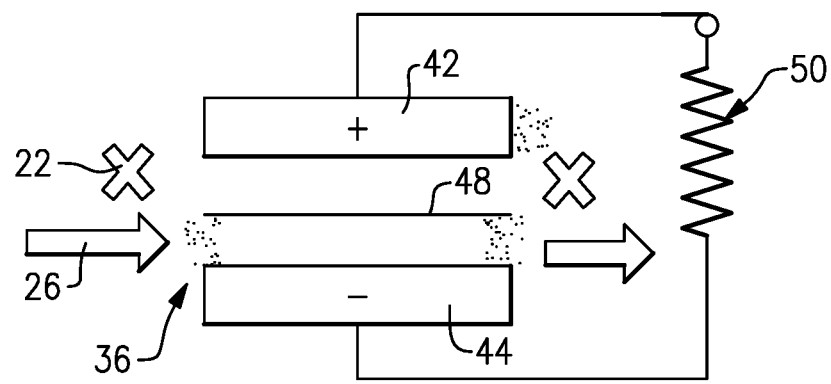

Once in the steady-state float mode, at 90 in the method 80 the controller 49 drives the open cell voltage toward zero by engaging a resistor 50 across the redox flow battery 20 (FIG. 4), and at 92 holds the flow battery 20 in this mode for a pre-selected amount of time (FIG. 5). In one example, the controller 49 drives the open cell voltage to less than 0.2V. By being driven toward zero, the species 24 in the positive electrode 42 react to chemically reduce to $V^{3+}$ and $V^{2+}$ ions in solution. This generated $V^{3+}/V^{2+}$ solution in the positive electrode 42 is readily reactive to dissolve the solid precipitant (FIG. 6), in situ, without the need to remove the electrolyte from the redox flow battery 20 or disassemble the battery 20. For instance, the $V^{3+}/V^{2+}$ solution drives an opposite reduction reaction to convert the precipitant oxides back into soluble oxides. Although such a reaction is kinetically favored even at low temperatures, the controller 49 may hold the steady-state float mode for a pre-selected amount of time, such as for about an hour, in order to ensure good dissolution of the precipitant blockage. It is further to be understood that although 0.2V may be a good threshold in typical examples to indicate that the voltage has been driven substantially to zero and that the reduction reaction was successful, that in other types of systems the threshold voltage may be somewhat lower or higher.

In one variation, the resistor 50 is excluded and, instead, the open cell voltage is driven toward zero via shunt currents in the electrolytes 22, 26. Although the shunt currents may be effective, the use of the resistor 50 is expected to more rapidly drive the open cell voltage down. In further alternatives, rather than the resistor 50, other energy-dissipating devices may be used, such as but not limited to, an electric grid or another redox flow battery.

Figure 7:
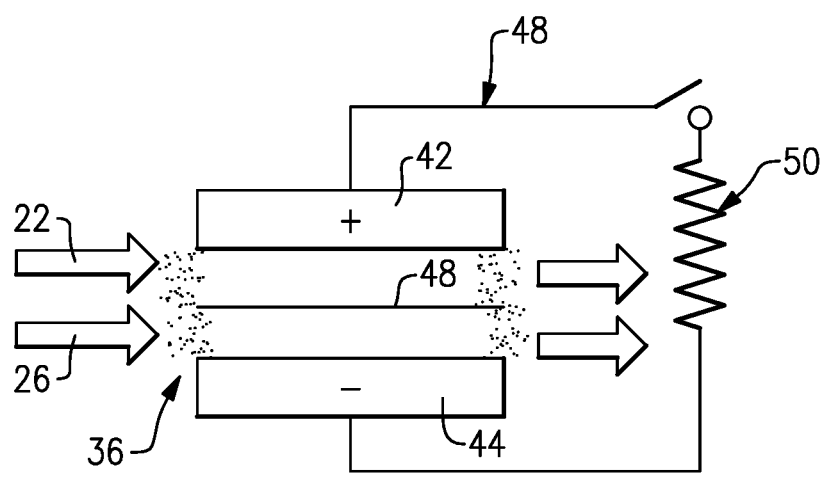

After the pre-selected amount of time, at 94 in the method 80 the controller 49 places the cell 36 in the active charge/discharge mode by starting the flow of the first electrolyte 22 through the cell 36 (FIG. 7). The cell then runs in this mode to either charge or discharge. Once started, the controller 49 can also initiate a verification to determine whether the solid precipitate blockage has been sufficiently alleviated. There are several approaches for verification. In one example, the controller 49 determines an instant pressure drop through the cell 36 and compares that to the pressure drop at initiation of the regeneration mode, to the baseline pressure drop, or both. The controller 49 may be configured to re-initiate the regeneration mode if the instant pressure drop does not meet a pre-determined threshold with regard to the prior pressure drop or with regard to the baseline pressure drop. That is, a negative verification represents that the solid precipitate blockage has not yet been sufficiently alleviated. If the verification is positive, the cell 36 continues to operate in the active charge/discharge mode.

In another approach, the supply/storage system 30 may further include a filter 54 (shown in phantom in FIG. 1) through which the liquid electrolyte flows. In this example, the filter 54 receives the first electrolyte 22. There may be pressure transducers 52 at an inlet and outlet of the filter 54 for measuring pressure of the liquid electrolyte. The controller 49 is configured to determine a pressure drop across the filter 54 for the verification. For example, dissolution of the solid precipitate blockage is likely to loosen precipitate deposits. These deposits are then captured in the filter 54. The deposits in the filter 54 cause an increase in pressure drop across the filter 54. The pressure drop across the filter 54 can be used to verify that deposits from the blockages have been loosened and captured. Thus, an increase in pressure drop can be used to verify whether the regeneration mode has been successful or not.

In any of the examples herein, the supply/storage system 30 may further include a heat exchanger, represented in phantom at 56. In this example, the heat exchanger 56 is in the loop L1 to receive the first electrolyte 22, but in alternative examples it may be in the second loop L2 or there may be heat exchangers in both loops L1/L2. The controller 49 may be configured in the regeneration mode to cool the electrolytes 22, 26 in the heat exchangers 54 in order to cool the cell 36. In the illustrated example, the heat exchanger 54 is situated to cool the first electrolyte 22, which generates heat in its electrochemical reaction. The cooling of the first electrolyte 22 in the regeneration mode facilitates the reaction of the solid precipitate blockage to the more soluble oxides. Such cooling is somewhat counter-intuitive to the objective of alleviating the precipitate. Many substances become less soluble with decrease in temperature. However, for vanadium that is subject to the thermally-induced reaction that generates the precipitate, the cooling drives the opposite reaction to the more soluble oxide species. Thus, the controller 49 can activate the heat exchanger 56 in the regeneration mode to facilitate dissolution.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A redox flow battery comprising:
   a redox flow cell;
   a supply/storage system external of the redox flow cell, the supply/storage system including first and second electrolytes for circulation through the redox flow cell, the first electrolyte is a liquid electrolyte having electrochemically active species with multiple, reversible oxidation states, wherein the electrochemically active species can form a solid precipitate blockage in the redox flow cell; and
   a controller that is configured to identify whether there is the solid precipitate blockage in the redox flow cell and, if so, initiate a regeneration mode that reduces the oxidation state of the electrochemically active species in the liquid electrolyte to dissolve, in situ, the solid precipitate blockage, wherein the controller is configured, in the regeneration mode, to cease an active external charge/discharge mode and to place the redox flow cell into an open cell voltage mode.

2. The redox flow battery as recited in claim 1, wherein the controller is configured, after placing the redox flow cell in the open cell voltage mode, to place the redox flow cell in a steady-state float mode in which flow of the first electrolyte through the redox flow cell is ceased and flow of the second electrolyte through the redox flow cell continues.

3. The redox flow battery as recited in claim 2, wherein the controller is configured, in the regeneration mode, to drive the open cell voltage toward zero by engaging a resistor across the redox flow battery.

4. The redox flow battery as recited in claim 3, wherein the controller is configured to drive the open cell voltage to less than 0.2V.

5. The redox flow battery as recited in claim 3, wherein the controller is configured to hold the steady-state float mode for a pre-selected amount of time.

6. The redox flow battery as recited in claim 5, wherein the controller is configured to, after the pre-selected amount of time, place the redox flow cell in the active external charge/discharge mode by starting the flow of the first electrolyte through the redox flow cell, and then initiate a verification to determine whether the solid precipitate blockage is alleviated.

7. The redox flow battery as recited in claim 6, wherein the supply/storage system further comprises a filter through which the liquid electrolyte flows, and pressure devices at an inlet and outlet of the filter for measuring pressure of the liquid electrolyte, wherein the controller is configured to determine a pressure drop across the filter for the verification.

8. The redox flow battery as recited in claim 6, wherein the controller is configured to re-initiate the regeneration mode if the solid precipitate blockage is not alleviated with respect to a threshold.

9. The redox flow battery as recited in claim 5, wherein the electrochemically active species include vanadium.

10. The redox flow battery as recited in claim 6, wherein the supply/storage system further comprises a heat exchanger, and the controller, in the regeneration mode, is configured to cool one of the electrolytes in the heat exchanger in order to cool the redox flow cell.

11. The redox flow battery as recited in claim 1, wherein the controller is configured, after placing the redox flow cell in the open cell voltage mode, to place the redox flow cell in a steady-state float mode in which flow of the first electrolyte through the redox flow cell is ceased and flow of the second electrolyte through the redox flow cell continues, and to hold the steady-state float mode for a pre-selected amount of time.

12. The redox flow battery as recited in claim 11, wherein the controller is configured to, after the pre-selected amount of time, place the redox flow cell in the active external charge/discharge mode by starting the flow of the first electrolyte through the redox flow cell, and then initiate a verification to determine whether the solid precipitate blockage is alleviated.

13. The redox flow battery as recited in claim 12, wherein the supply/storage system further comprises a filter through which the liquid electrolyte flows, and pressure devices at an inlet and outlet of the filter for measuring pressure of the liquid electrolyte, wherein the controller is configured to determine a pressure drop across the filter for the verification.

14. The redox flow battery as recited in claim 13, wherein the controller is configured to re-initiate the regeneration mode if the solid precipitate blockage is not alleviated with respect to a threshold.

15. The redox flow battery as recited in claim 14, wherein the supply/storage system further comprises a heat exchanger, and the controller, in the regeneration mode, is configured to cool one of the electrolytes in the heat exchanger in order to cool the redox flow cell.

16. The redox flow battery as recited in claim 15, wherein the controller is configured, in the regeneration mode, to drive the open cell voltage toward zero by engaging a resistor across the redox flow battery.

17. A method for regenerating a flow battery, the flow battery including a redox flow cell and a supply/storage system external of the redox flow cell, the supply/storage system including first and second electrolytes for circulation through the redox flow cell, the first electrolyte is a liquid electrolyte having electrochemically active species with multiple, reversible oxidation states, wherein the electrochemically active species can form a solid precipitate blockage in the redox flow cell, the method comprising:
identifying whether there is a solid precipitate blockage in the redox flow cell;
in response to identifying that there is a solid precipitate blockage, initiating a regeneration mode that reduces an oxidation state of electrochemically active species in the liquid electrolyte to dissolve, in situ, the solid precipitate blockage, wherein in the regeneration mode an active external charge/discharge mode is ceased and the redox flow cell is placed into an open cell voltage mode.

18. The method as recited in claim 17, wherein, after placing the redox flow cell in the open cell voltage mode, placing the redox flow cell in a steady-state float mode in which flow of the first electrolyte through the redox flow cell is ceased and flow of the second electrolyte through the redox flow cell continues, holding the steady-state float mode for a pre-selected amount of time, driving the open cell voltage toward zero by engaging a resistor across the redox flow battery, after the pre-selected amount of time, placing the redox flow cell in the active external charge/discharge mode by starting the flow of the first electrolyte through the redox flow cell, and then initiating a verification to determine whether the solid precipitate blockage is alleviated.

* * * * *